(12) United States Patent (10) Patent No.: US 8,984,559 B2
Kothari (45) Date of Patent: Mar. 17, 2015

(54) PERSONALIZED AUTO-GENERATED ELECTRONIC PROGRAMMING GUIDE FOR CONTENT DELIVERY PLATFORMS

(75) Inventor: Devesh Kothari, Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/493,422

(22) Filed: Jun. 11, 2012

(65) Prior Publication Data

US 2013/0332959 A1 Dec. 12, 2013

(51) Int. Cl.
*G06F 3/00* (2006.01)
*G06F 13/00* (2006.01)
*H04N 5/445* (2011.01)
*G06Q 30/02* (2012.01)
*H04N 21/25* (2011.01)
*H04N 21/258* (2011.01)
*H04N 21/262* (2011.01)
(Continued)

(52) U.S. Cl.
CPC ............ *G06Q 30/02* (2013.01); *H04N 21/251* (2013.01); *H04N 21/25883* (2013.01); *H04N 21/25891* (2013.01); *H04N 21/26233* (2013.01); *H04N 21/26241* (2013.01); *H04N 21/26283* (2013.01); *H04N 21/2668* (2013.01); *H04N 21/2743* (2013.01); *H04N 21/41407* (2013.01); *H04N 21/44222* (2013.01); *H04N 21/47214* (2013.01); *H04N 21/4756* (2013.01); *H04N 21/4788* (2013.01); *H04N 21/4826* (2013.01); *H04N 21/64322* (2013.01); *H04N 21/6582* (2013.01); *H04N 21/812* (2013.01); *H04N 21/8173* (2013.01)
USPC ................... 725/46; 725/37; 725/38; 725/39; 725/44; 725/45

(58) Field of Classification Search
USPC ............................................. 725/46
See application file for complete search history.

(56) References Cited

U.S. PATENT DOCUMENTS 6,670,971 B1 * 12/2003 Oral .............................. 715/769
8,751,672 B2 * 6/2014 Zafar et al. ................... 709/229
(Continued)

FOREIGN PATENT DOCUMENTS

| WO | 02071266 | | 9/2002 | |
|----|----------|---|--------|---|
| WO | WO 02/071266 | * | 9/2002 | ............. G06F 17/30 |
| WO | WO 02071266 | * | 9/2002 | |

OTHER PUBLICATIONS

International Search Report for and Written Opinion of the International Searching Authority for International Patent Application No. PCT/US13/41681 mailed Jun. 10, 2013.

*Primary Examiner* — Robert Hance
(74) *Attorney, Agent, or Firm* — Lowenstein Sandler LLP

(57) ABSTRACT

A personalized auto-generated electronic programming guide for content delivery platforms is presented. A method to create a personalized auto-generated electronic programming guide (EPG) for content delivery platforms is also provided. The method can include obtaining, by a computing device, user preferences for content to be scheduled for a user, the user preferences including a type of content and a preferred time to view the type of content. The method can also include identifying one or more content items of a content hosting service that satisfy the user preferences and scheduling the identified one or more content items according to the user preferences. The method can also include presenting information about the scheduled one or more content items in a personalized EPG and providing the personalized EPG for display to the user.

19 Claims, 7 Drawing Sheets

(51) Int. Cl.
*H04N 21/2668* (2011.01)
*H04N 21/2743* (2011.01)
*H04N 21/414* (2011.01)
*H04N 21/472* (2011.01)
*H04N 21/475* (2011.01)
*H04N 21/4788* (2011.01)
*H04N 21/482* (2011.01)
*H04N 21/643* (2011.01)
*H04N 21/658* (2011.01)
*H04N 21/442* (2011.01)
*H04N 21/81* (2011.01)

(56) References Cited

U.S. PATENT DOCUMENTS

| | | | |
|---|---|---|---|
| 2002/0133821 A1* | 9/2002 | Shteyn | 725/46 |
| 2003/0093793 A1* | 5/2003 | Gutta | 725/46 |
| 2004/0117853 A1* | 6/2004 | Karaoguz et al. | 725/134 |
| 2004/0216168 A1* | 10/2004 | Trovato et al. | 725/135 |
| 2008/0052742 A1* | 2/2008 | Kopf et al. | 725/34 |
| 2008/0222689 A1* | 9/2008 | Howcroft et al. | 725/110 |
| 2008/0276279 A1* | 11/2008 | Gossweiler et al. | 725/46 |
| 2009/0172751 A1* | 7/2009 | Aldrey et al. | 725/87 |
| 2009/0320072 A1* | 12/2009 | McClanahan et al. | 725/47 |
| 2009/0328104 A1* | 12/2009 | Jones et al. | 725/46 |
| 2010/0064307 A1* | 3/2010 | Malhotra et al. | 725/24 |
| 2010/0199312 A1* | 8/2010 | Chang et al. | 725/46 |
| 2010/0251304 A1* | 9/2010 | Donoghue et al. | 725/46 |
| 2010/0251305 A1* | 9/2010 | Kimble et al. | 725/46 |
| 2011/0078731 A1* | 3/2011 | Nishimura | 725/39 |
| 2011/0185385 A1* | 7/2011 | Park et al. | 725/40 |
| 2011/0302609 A1* | 12/2011 | Hems et al. | 725/40 |
| 2013/0061266 A1* | 3/2013 | Chai et al. | 725/41 |
| 2013/0332959 A1* | 12/2013 | Kothari | 725/39 |

* cited by examiner

500 

```
┌─────────────────────────────────────────────────────────────┐
│ Displaying a personalized EPG to a user of a shared content │
│                    hosting and delivery platform            │
│                                                         510 │
└─────────────────────────────────────────────────────────────┘
                              ↓
┌─────────────────────────────────────────────────────────────┐
│ Receiving configuration settings from the user allowing one │
│ or more subsets of other users to view the personalized EPG │
│ of the user                                                 │
│                                                         520 │
└─────────────────────────────────────────────────────────────┘
                              ↓
┌─────────────────────────────────────────────────────────────┐
│ Displaying, to the user, one or more personalized EPGs of   │
│ other users, wherein each of the other users are in a       │
│ social network of the user and allow the user access to     │
│ their personalized EPG                                      │
│                                                         530 │
└─────────────────────────────────────────────────────────────┘
                              ↓
┌─────────────────────────────────────────────────────────────┐
│ Receiving, from the user, a selection of one of the         │
│ personalized EPGs of other users                            │
│                                                         540 │
└─────────────────────────────────────────────────────────────┘
                              ↓
┌─────────────────────────────────────────────────────────────┐
│ Displaying, to the user, the current programming content of │
│ the selected personalized EPG of the other user             │
│                                                         550 │
└─────────────────────────────────────────────────────────────┘
```

FIGURE 5

PERSONALIZED AUTO-GENERATED ELECTRONIC PROGRAMMING GUIDE FOR CONTENT DELIVERY PLATFORMS

TECHNICAL FIELD

Embodiments of the present disclosure relate to the field of content delivery platforms and, more particularly, to a personalized auto-generated electronic programming guide for content delivery platforms.

BACKGROUND

On the Internet, content sharing platforms allow users to upload, view, and share content, such as video content, image content, audio content, and so on. This shared content may include content from professional content creators, e.g., movie clips, TV clips, and music videos, as well as content from amateur content creators, e.g., video blogging and short original videos. One aspect of content sharing platforms is content delivery to the end user.

Content sharing platforms typically do not provide the same end-user experience for content delivery as the television broadcast medium. With the television broadcast medium, end users usually get a media programming model, where various professional media companies create a program guide, with the content and time to broadcast already selected. The job of the end consumer of the television broadcast medium is to switch on the television and watch. This can be a simple and efficient task for end users.

However, the television broadcast medium is typically a static and inflexible one-way broadcast medium. As a result, there is a limit to the customization and specialization that can be accomplished for an end user. For example, the television broadcast medium usually cannot take into account an end user's schedule and the individual preferences of the end user.

SUMMARY

In one embodiment, a method to provide personalized auto-generated electronic programming guide for content delivery platforms is presented. The method includes obtaining user preferences for content to be scheduled for a user. The user preferences can include a type of content preferred by the user and a time, preferred by the user, to view the type of preferred content. The method can also include identifying one or more content items of a content hosting service that satisfy the user preferences and scheduling the identified one or more content items according to the user preferences. The method can also include presenting information about the scheduled one or more content items in a personalized electronic programming guide (EPG) and providing the personalized EPG for display to the user.

In one embodiment, the method further can include receiving access to a personal calendar of the user, analyzing data representing the personal calendar of the user to determine suggestions for the user preferences, and presenting a user interface (UI) to the user reflecting the determined suggestions for the user preferences. In addition, identifying the one or more content items can further include selecting the one or more content items based on other data that is related to the user, the other data including a location of the user, user-provided content ratings, and content ratings provided by associates of the user.

Furthermore, the method can include the user selecting a personalized EPG of an associate of the user to represent the user preferences or the user selecting a template of a plurality of templates to represent the user preferences. In some embodiments, the personalized EPG of the associate of the user is presented as a channel in the personalized EPG of the user. The method can also include the one or more content items including video content items. The method can further include sharing the personalize EPG of the user with one or more associates of the user. In addition, the method can include the one or more associates of the user being part of a social network of the user.

In additional embodiments, computing devices for performing the operations of the above described embodiments are also implemented. Additionally, in embodiments of the disclosure, a computer readable storage media stores methods for performing the operations of the above described embodiments.

BRIEF DESCRIPTION OF THE DRAWINGS

The present disclosure will be understood more fully from the detailed description given below and from the accompanying drawings of various embodiments of the disclosure.

FIG. 5 is a flow diagram illustrating a method of sharing personalized EPGs according to an embodiment of the disclosure.

DETAILED DESCRIPTION

A system and method for personalized auto-generated electronic programming guide for content delivery platforms are described. In some embodiments, a personalized auto-generated electronic programming guide (EPG) is created that presents content items uploaded to one or more content delivery platforms as viewing selections that satisfy user-provided hints and other user-context hints for various time slots in the EPG. This personalized auto-generated EPG may take into account an end user's schedule and personal preferences. Although such customization can be taken into account on content sharing platforms, the platforms have generally lacked the ease of programming presentation and simplicity that television broadcast mediums provide. Embodiments of the invention address these limitations.

A method to create a personalized auto-generated electronic programming guide for content delivery platforms includes obtaining user preferences for content to be scheduled for a user. In one embodiment, the user preferences indicate a type of preferred content, and a preferred time to view the type of preferred content. The method can also include identifying one or more content items of a content hosting service that satisfy the user preferences and scheduling the identified one or more content items according to the user preferences. The method can also include presenting information about the scheduled one or more content items in a personalized EPG and providing the personalized EPG for display to the user. For example, a user may give access to his/her calendar to a content delivery platform, which fills up relevant content for the user in a personalized EPG calendar of the user, reminds the user of upcoming shows, and so on.

It is to be appreciated that in accordance with one or more aspects described in this disclosure, users can opt-out of providing personal information, demographic information, location information, proprietary information, sensitive information, or the like in connection with data gathering aspects. Moreover, one or more aspects described herein can provide for anonymizing collected, received, or transmitted data.

Figure 1:
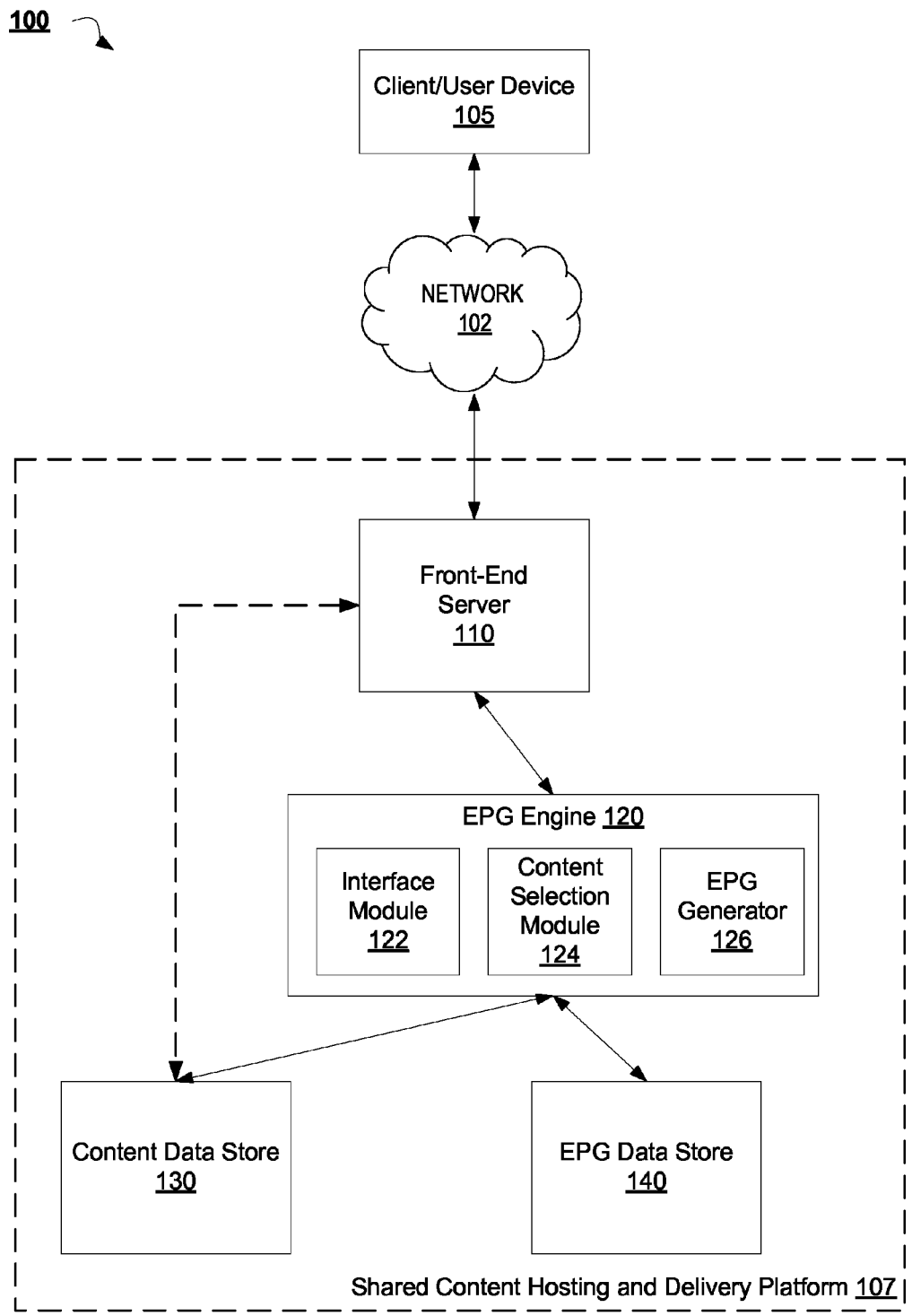
FIG. 1 illustrates an exemplary system architecture, in accordance with one embodiment of the present disclosure.

FIG. 1 illustrates an exemplary system architecture 100, in accordance with one embodiment of the present disclosure. System 100 includes a client/user device 105 communicably coupled to a shared content hosting and delivery platform 107 via a network 102. The network 102 includes the Internet in one embodiment. In other embodiments, other networks, wired and wireless, such as an intranet, local area network (LAN), wide area network (WAN), or broadcast network may be used as or be part of network 102.

As illustrated, shared content hosting and delivery platform 107 includes front-end server 110, an electronic programming guide (EPG) engine 120, a content data store 130, and an EPG data store 140. A data store may include, but is not limited to, a table, a database, a directory, a repository, and one or more files, to name a few examples. One or more client/user devices 105 are in communication with the front-end server 110 over the network 102.

The client/user device 105 may be any type of computing device, for example, a device including a processor, a computer-readable medium, and a memory. The client/user device 105 may be, for example, a personal computer, a laptop computer, a tablet computer, a personal digital assistant (PDA), a cellular telephone, other mobile devices, etc. In some embodiments, the client/user device 105 may be executing a browser application or other application adapted to communicate over Internet related protocols (e.g., TCP/IP and HTTP) and/or display a user interface. While only a single client/user device 105 is shown in FIG. 1, system 100 may support a large number of concurrent sessions with many client/user devices 105.

Shared content hosting and delivery platform 107 may operate within a single server device or on multiple server devices. For example, although each of front-end server 110, EPG engine 120, content data store 130, and EPG data store 140 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, and similar type of systems and devices.

During operation of system 100, a user accesses shared content hosting and delivery platform 107 via client/user device 105 over network 102. The front-end server 110 receives communications from the client/user device 105, and processes and/or directs these communications accordingly. In one embodiment, the front-end server 110 comprises a processing device and a computer-readable memory.

Front-end server 110 is communicably coupled to an EPG engine 120, which may reside on the same machine as front-end server 110 or a different machine. EPG engine 120 may be implemented in hardware, software, firmware, or any combination of the above. In embodiments of the disclosure, EPG engine 120 accesses user content that is uploaded to system 100 and stored in content data store 130 to create a personalized EPG for a user of the shared content hosting and delivery platform 107. In embodiments of the disclosure, user content includes content generated by a user or content generated by a third party and permissibly uploaded by the user. In some embodiments, the content includes movie clips, TV clips (news, sports, shows, etc.), music videos, video blogs, and video shorts. In one embodiment, the EPG engine 120 notifies users of the types of information that may be stored in the content data store 130 and EPG data store 140, and provides the user the opportunity to opt-out of having such information stored and/or accessible by and/or shared with the EPG engine 120.

In one embodiment, the EPG engine 120 includes an interface module 122. As part of requesting a personalized EPG, the user may allow access to a personal calendar of the user. In one embodiment, when the personalized EPG creation process is invoked by a user, the interface module 122 of the EPG engine 120 sends a request, e.g., via a content delivery platform component of the shared content hosting and delivery platform 107, to the user requesting access to one or more personal calendars of the user. The personal calendars may include a third-party hosted calendar that is not associated with the shared content hosting and delivery platform 107.

When the user provides personal calendar access permission to the EPG engine 120, the interface module 122 may obtain data representing the calendar schedule of the user, e.g., using a calendar application programming interface (API), and, based on this data, determine available time slots in the user's schedule. In one embodiment, the interface module 122 provides an application programming interface (API) to interact with the user's calendar. In addition, the interface module 122 can examine a user's indicated activities during "busy" timeslots to determine if programming suggestions can also optionally be made during those times (e.g., time earmarked as commuting or traveling, etc.) In one embodiment, the user can schedule time on the user's calendar during which the user would like to view content. The interface module 122 can retrieve those time slots, e.g., via a calendar API, and determine programming suggestions for those timeslots. Utilizing the user's calendar information, the interface module 122 works cooperatively with EPG generator 126 of the EPG engine 120 to create a personalized EPG template for the user.

Figure 2A:
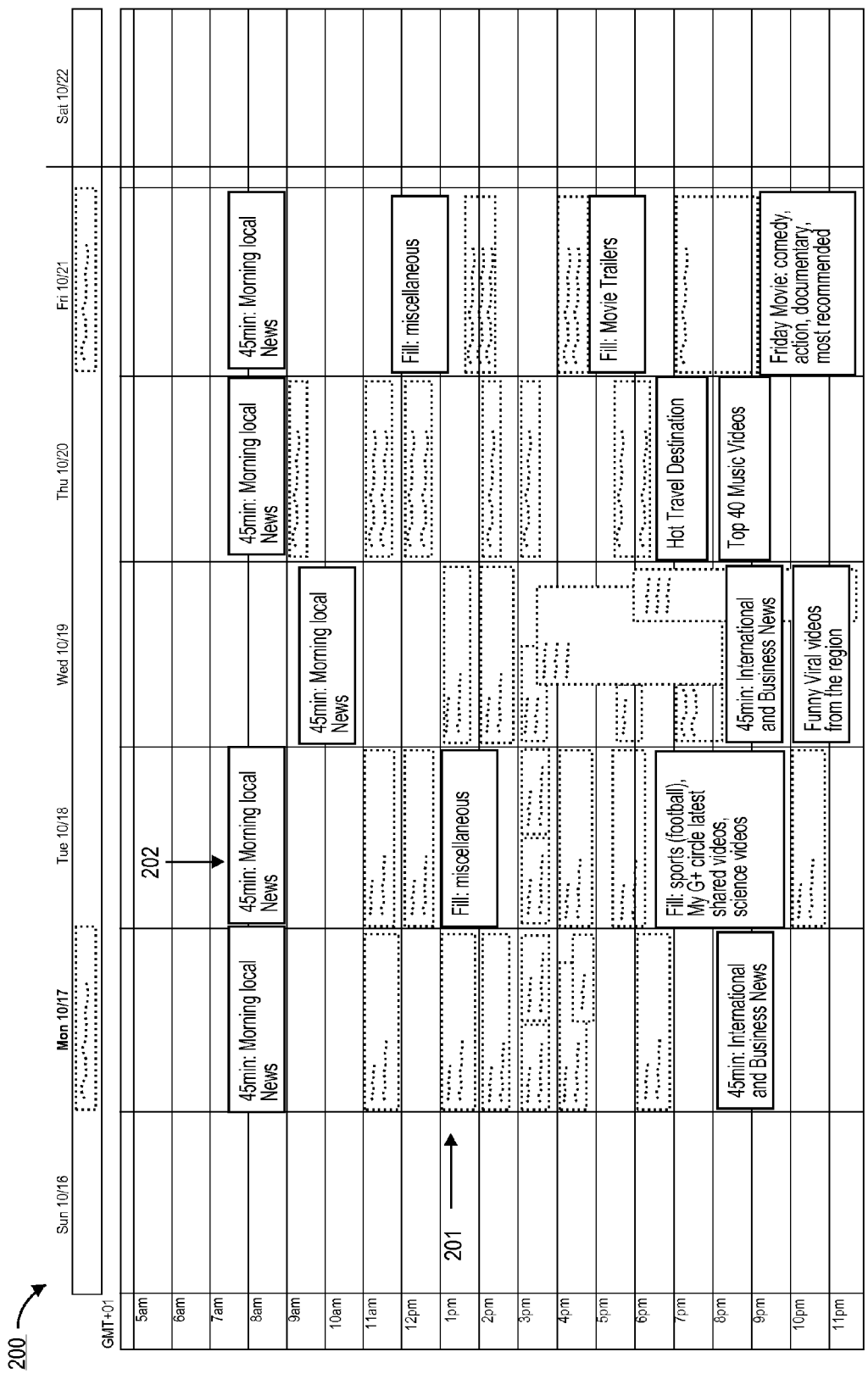
FIG. 2A illustrates a screenshot of a personal calendar of a user accessible by an Electronic Programming Guide (EPG) engine, in accordance with embodiments of the present disclosure.

FIG. 2A is a screenshot of a personal calendar 200 of a user that is shared with an EPG engine 120 according to an embodiment of the disclosure. The personal calendar 200 includes the pre-existing scheduled appointments and activities of the user 201. After the EPG engine 120 analyzes the pre-existing schedule 201 of the user, it determines one or more programming time slots 202 to be filled with content from the shared content hosting and delivery platform 107. In some embodiments, the personal calendar 200 includes programming logic to provide the available time slot information to the EPG engine 120, including information such as the date and time of the time slot(s) and the length of the time slot(s), for example.

In one embodiment, the personalized EPG template is displayed to the user by interface module 122 to enable the selection of user preferences regarding content that the user prefers to watch during various time slots, as well as preferred time slots to view the type of content. For example, the interface module 122 may provide drop-down menus with pre-configured categories (e.g., sports, local news, national news, TV, movie, music, etc.) in each of the time slots on the EPG template. The pre-configured categories can be selected by the interface module 122 based on previous user history during the time slot. In some embodiments, each pre-configured category is further narrowed down through multiple levels, as determined by the configuration of the EPG engine 120. For example, the sports category can be narrowed into different sports types, regions, ability levels, and so on. The user can select one of the pre-configured categories, or provide free text in the time slot, to indicate a content preference of the user during the particular time slot.

In some embodiments, the user also indicates via dropdown menus or other input mechanisms one or more preferred time slots to view the indicated content types. The preferred time may be a specific time (e.g., 7 pm) or a preferred type of time (e.g., morning, afternoon, evening, commute time, etc.).

For example, after a user's personal calendar data is analyzed to determine free time slots, an EPG template is displayed to the user that contains programming suggestions in each of the identified free time slots. The EPG template can suggest that the user watch local news between 7:30-8:30 AM every morning and watch business and international news every evening between 8 PM-8:45 PM. In addition, the EPG template can suggest that because the user is commuting every weekday between 9:00-9:45 AM and 7:00-7:45 PM, that these time periods be filled with funny viral videos and social content. Furthermore, the EPG template can suggest that the user watch a movie on Sunday from 9:00 PM-11:30 PM. The user can modify and change the programming suggestions in each time slot based on the user's individual preferences.

Figure 2B:
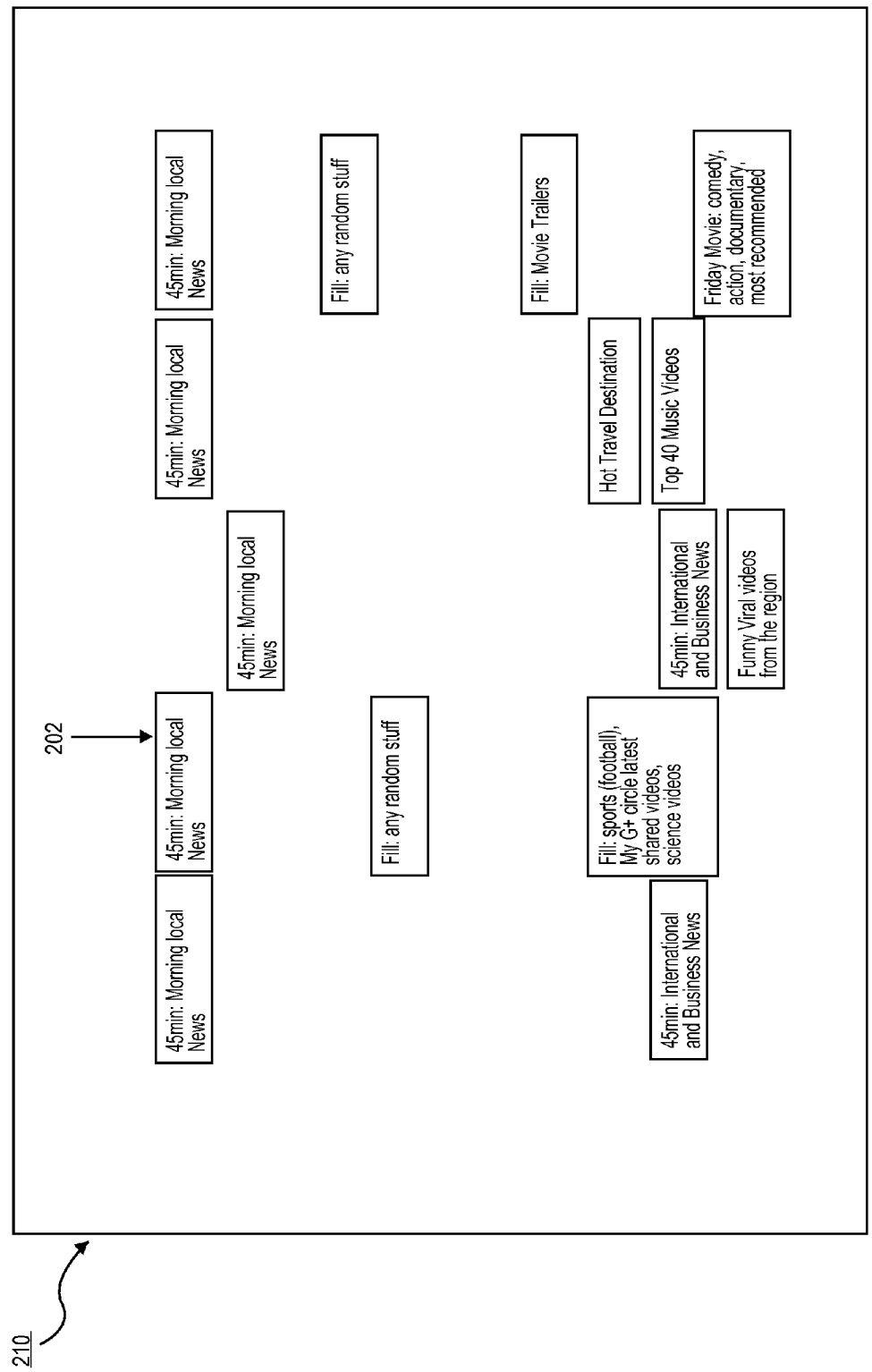
FIG. 2B illustrates a screenshot of an EPG template created from a personal calendar of a user, in accordance with embodiments of the present disclosure.

FIG. 2B is a screenshot of an EPG template 210 for a user according to an embodiment of the disclosure. The EPG template 210 can be created by EPG engine 120 and displayed to the user to aid in selection of programming categories for programming timeslots 202. The EPG template 210 includes one or more programming time slots 202 with pre-configured programming categories to be selected or updated by the user according to the programming preferences of the user at the particular programming timeslot.

In some embodiments, instead of the user granting access to a personal calendar, the user is able instead to download an EPG template from the shared content hosting and delivery platform 107. In one embodiment, the template is a themed template, such as a sports-themed template, a health-themed template, a world news themed template, and so on. The user can then modify and change the suggested programming of the themed template, including the time slots of the programming, per their individual preferences. In some embodiments, a user is able to import an EPG template of another user in the user's social network or elsewhere (as long as the other user's permissions allow this access).

Referring to FIG. 1, when the user has selected and submitted their content preferences in the EPG template, these selections are provided as inputs to content selection module 124 of the EPG engine 120. In one embodiment, the input is received as data indicating times and associated content types for the particular user. The content selection module 124 uses the input, along with other "hints", to select personalized content from the content data store 130 to play during each time slot. In one embodiment, the other "hints" include data that is not explicitly provided in the user's calendar, such as an Internet Protocol (IP) address of the user to indicate location (e.g., a country or region, which may determine available content in some instances), previous content ratings indicated by the user, content preferences of other user in a social network of the user (as long as the other user's have given permission to share these preferences), content that is globally popular, and so on.

In one embodiment, the content selection module 124 may perform a probability-based algorithm to select multiple content programs that satisfy the content type and hints for each time slot. For example, the content selection module 124 may select the top five content programs that satisfy the requirements of the particular time slot. In this way, if the user rejects a content selection, the next program in the returned selection list may be displayed in the user's personalized EPG. In some embodiments, the content is selected from multiple backend content providers, allowing for a larger selection of content for the user.

The selected content and time slot data is then passed to the EPG generator 126 to finalize the personalized EPG for the user. In one embodiment, the EPG generator 126 obtains thumbnails and descriptions of the selected programming content for display in the personalized EPG. For full-length content, the EPG generator 126 can also provide a "Buy" content icon for paid content or rented content.

Data representing the personalized EPG for the user can be stored in an EPG data store 140 communicably coupled to the EPG engine 120. The EPG engine 120 provides the finalized EPG for the user to a content delivery component of the shared content hosting and delivery platform 107, which displays the personalized EPG to the user at the user's client/user device 105. In some embodiments, the EPG engine 120 can insert relevant in-stream advertisements into the selected content, partner videos for high-quality content, etc. In further embodiments, the EPG engine 120 reminds the user of upcoming shows scheduled in his/her finalized EPG.

In one embodiment, if a user does not want or like a content programming suggestion of the EPG, then the user can provide feedback to this effect in terms of ratings, such as star ratings or thumbs up/down. In some embodiments, the user can dismiss a programming option provided in the EPG and a new programming selection is then displayed in the EPG (e.g., from the returned list of programming selections provided by content selection module 124). The user can also manually select particular content programming they would prefer to watch during a time slot. This manual selection can be noted by the EPG engine 120 for future programming preferences and personalized EPG creation.

Figure 3:
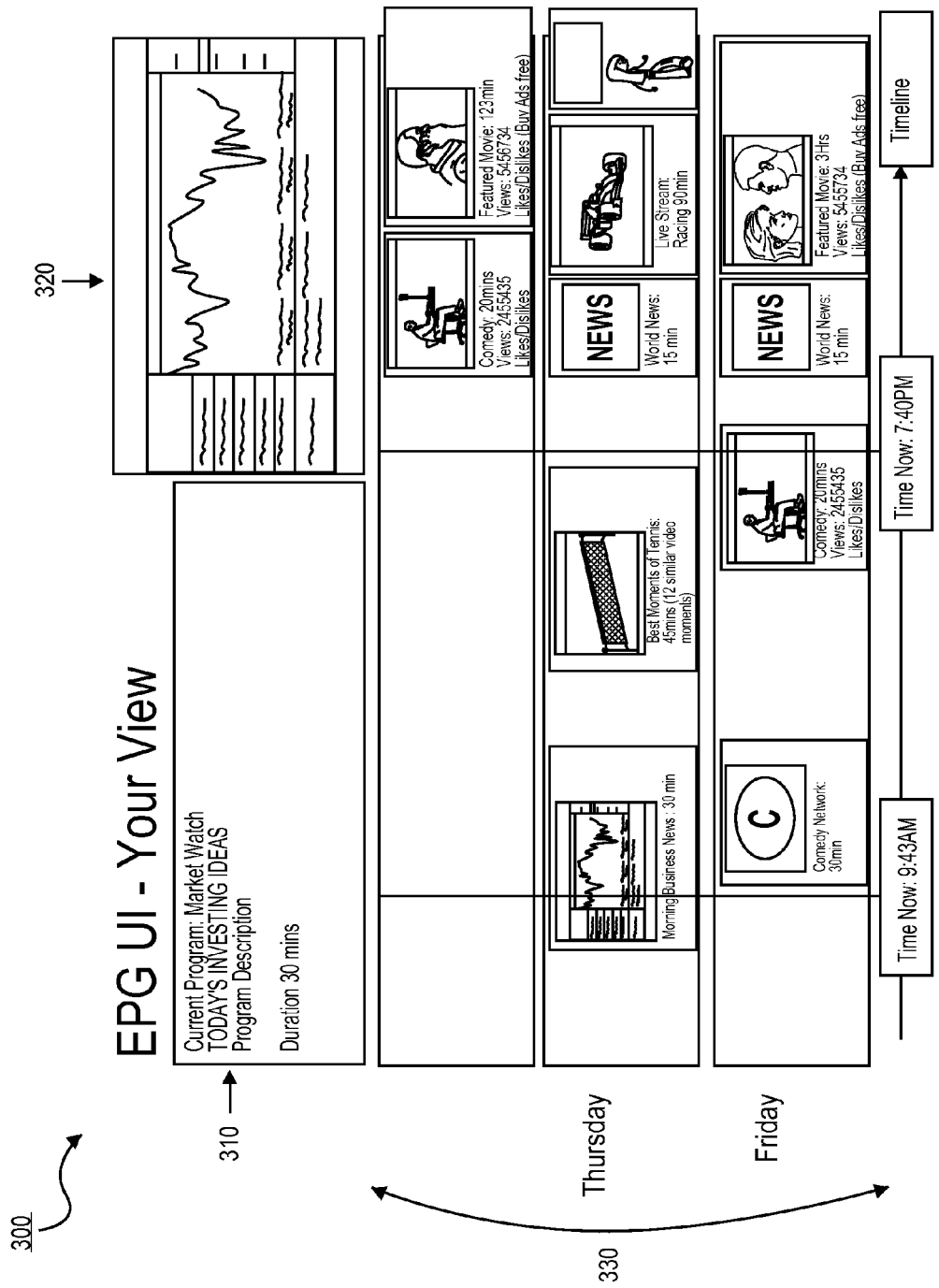
FIG. 3 illustrates a screenshot of a personalized EPG for a user, in accordance with another embodiment of the present disclosure.

FIG. 3 illustrates a screenshot of a personalized EPG 300 according to an embodiment of the disclosure. Personalized EPG 300 displays, in a programming guide format, content selected for an individual user based on a personal schedule and content preferences of the user. In one embodiment, personalized EPG 300 is provided by a content delivery player component of the shared content hosting and delivery platform at the client/user device 105. As depicted, personalized EPG 300 includes a description 310 of a current programming selection (e.g., a selected content item for a current programming time slot) and a thumbnail view 320 of the current programming selection. In addition, the personalized EPG 300 displays an upcoming schedule 330 of content programming including thumbnails and a short description for each programming selection.

In some embodiments, the user is further able to share their personalized EPG with other users in their social network and beyond. In some embodiments, the other users in the social network(s) of the user may be referred to as "associates" of the user. Similar to the user borrowing another user's EPG template as described above, the user can set their configuration settings to share their own personalized EPG. In some embodiments, the user is able to configure settings to allow different types of users and/or social networks to see different aspects of their personalized EPG. For example, the user can configure their settings to allow one subset of users to see the backend EPG template with generic categories of content, while allowing a second subset of users to see the actual programming content of the personalized EPG of the user. Furthermore, depending on user configuration settings, other user's personalized EPG templates may be displayed in the content delivery player of the user as another "channel" of programming content that the user may view at each programming time slot.

In other embodiments, the personalized EPGs of other users that are in a social network of the user are displayed as channels in the personalized EPG of the user. For example, each social contact in a user's social network with a personalized and shared EPG, may be assigned a "channel" in the personalized EPG of the user. The personalized EPG UI can then show individual channels in the personalized EPG UI of the user, allowing the user to switch between his or her own programming and programming being watched by their contact in the social network. For example, assume that a user has contacts named Bob, Helen, Jack in his/her social network, each with their own auto programmed EPG. In some embodiments, the user can switch between his/her own channels and the contacts' channels via the personalized EPG of the user. This allows contacts in a social network to watch programs together, rate similar programming, comment on similar programming, and so on.

Figure 4:
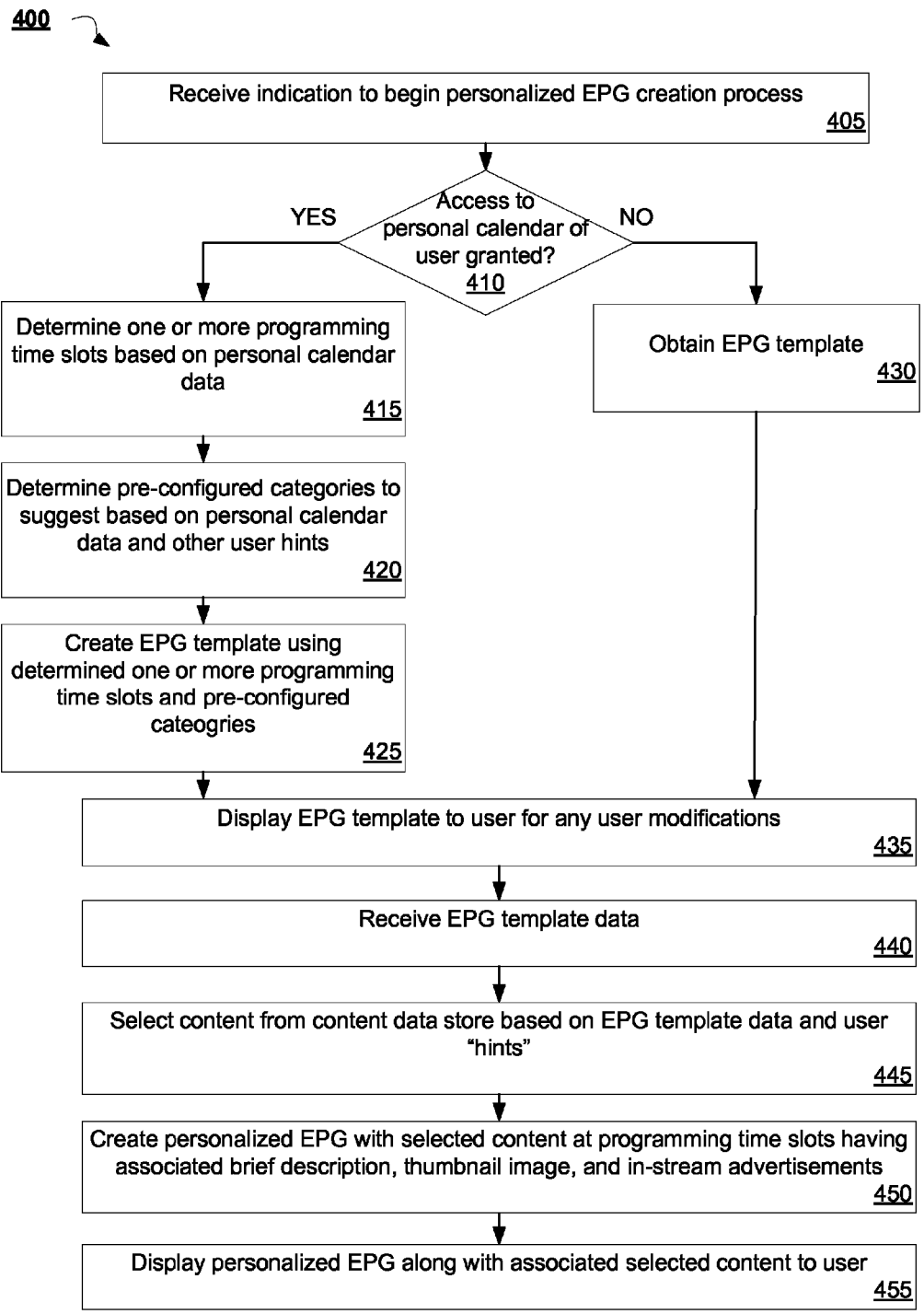
FIG. 4 is a flow diagram illustrating a method of creating a personalized EPG for a user of a shared content hosting and delivery platform according to an embodiment of the disclosure.

FIGS. 4 and 5 are flow diagrams of various embodiments of methods for generating and sharing a personalized EPG for a user of a shared content hosting and delivery platform. The methods are performed by processing logic that may include hardware (circuitry, dedicated logic, etc.), software (such as is run on a general purpose computer system or a dedicated machine), or a combination of both. In one embodiment, the methods of FIGS. 4-5 may be performed by EPG engine 120 running on a server machine or another machine as described with respect to FIG. 1.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

FIG. 4 is a flow diagram illustrating a method 400 of creating a personalized EPG for a user of a shared content hosting and delivery platform according to an embodiment of the disclosure. At block 405, an indication is received at an EPG engine of the shared content hosting and deliver platform to begin a personalized EPG creation process. In one embodiment, a user of the platform requests the creation of a personalized EPG. In other embodiments, the shared content and hosting platform automatically provides personalized EPG creation as a service of the platform.

At decision block 410, it is determined whether access to a personal calendar of the user has been granted. In one embodiment, the EPG engine explicitly requests access to any personal calendars of the user detected on a computing device of the user or on an account of the user on the shared content hosting and delivery platform. If the user grants access to a personal calendar, then, at block 415, one or more programming timeslots are determined based on the personal calendar data. For example, programming timeslots may be identified at all or some free times in the user's personal calendar. At block 420, pre-configured categories specific to the user are determined based on the personal calendar data (e.g., history of time slot) and any other user "hints" (e.g., user-provided ratings found in the shared content hosting and delivery platform, etc.). At block 425, an EPG template is created using the determined programming time slots and the pre-configured categories.

If, at decision block 410, the user does not grant access to their personal calendar(s), then method 400 proceeds to block 430, where an EPG template is obtained for the user. In one embodiment, the user may be directed to a generic template datastore to select an EPG template. In one embodiment, the generic EPG templates are themed to particular categories such as sports, news, movies, most popular, and so on. In some embodiments, an EPG template that another user has shared is made available to the user. In other embodiments, the EPG engine to uses a selected EPG template independent of whether the user has allowed access to his/her personal calendar.

At block 435, the EPG template is displayed to the user to allow the user to make modifications to the template. For example, the user may change a pre-configured category at one or more time slots, may change programming time slots to different times, and/or may provide free text indicated the particular preference of the user at a time slot. Then, at block 440, the EPG template data is received from the user. At block 445, the EPG template data is used to select content from a content data store of the shared content hosting and delivery platform. The selected content should satisfy the indicated categories of content provided in the EPG template data, as well as other "hints" related to the user. In one embodiment, the other "hints" optionally include an IP address of the user to indicate location (e.g., a country or region, which may determine available content in some instances), previous content ratings indicated by the user, content preferences of other users in a social network of the user (if other users have given permission to share these preferences), content that is globally popular, sources of content to which the user has subscribed or otherwise shown a preference, categories or keywords of content to which the user has subscribed or otherwise shown an interest, and so on.

At block 450, a personalized EPG is created for the user. In one embodiment, the personalized EPG includes the selected content at the programming time slots along with associated brief description, thumbnail image, and in-stream advertisements. At block 455, the created personalized EPG is displayed to the user along with the associated selected content. In one embodiment, a content delivery player of the shared content hosting and delivery platform provides the personalized EPG to the user at a device of the user.

FIG. 5 is a flow diagram illustrating a method 500 of sharing personalized EPGs according to an embodiment of the disclosure. At block 510 of method 500, a personalized EPG of a user is displayed to the user. In one embodiment, the personalized EPG is displayed on a content delivery player of the shared content hosting and delivery platform at a device of the user. In one embodiment, the personalized EPG is created according to method 400 described with respect to FIG. 4.

At block 520, configuration settings are received from the user that allow one or more subset of other users to view the personalized EPG of the user. In one embodiment, the configuration settings indicate the portions of the EPG and corresponding subsets of users allowed access to the portions. For example, the user may configure the settings so that a first subset of users may only view the template of the personalized EPG of the user, while a second subset of users may view the template and the programmed content of the personalized EPG. In one embodiment, the configuration settings are part of a privacy policy of the user, which is customizable by the user.

At block 530, one or more other personalized EPGs of other users are displayed to the user. In one embodiment, each of the other users is in one or more social networks of the user and allows the user access to their personalized EPG. In one embodiment, the configuration settings of each of the other users determine which portions of their personalized EPGs are viewable by the user. In one embodiment, the other personalized EPGs are displayed to the user as another available "channel" in the personalized EPG of the user.

At block 540, a selection is received from the user of one of the other personalized EPGs. In one embodiment, the user selects the "channel" within the personalized EPG of the user that corresponds to the other personalized EPG of the other user. Then, at block 550, current programming content of the selected other personalized EPG is displayed to the user in the content delivery player component at the device of the user.

Figure 6:
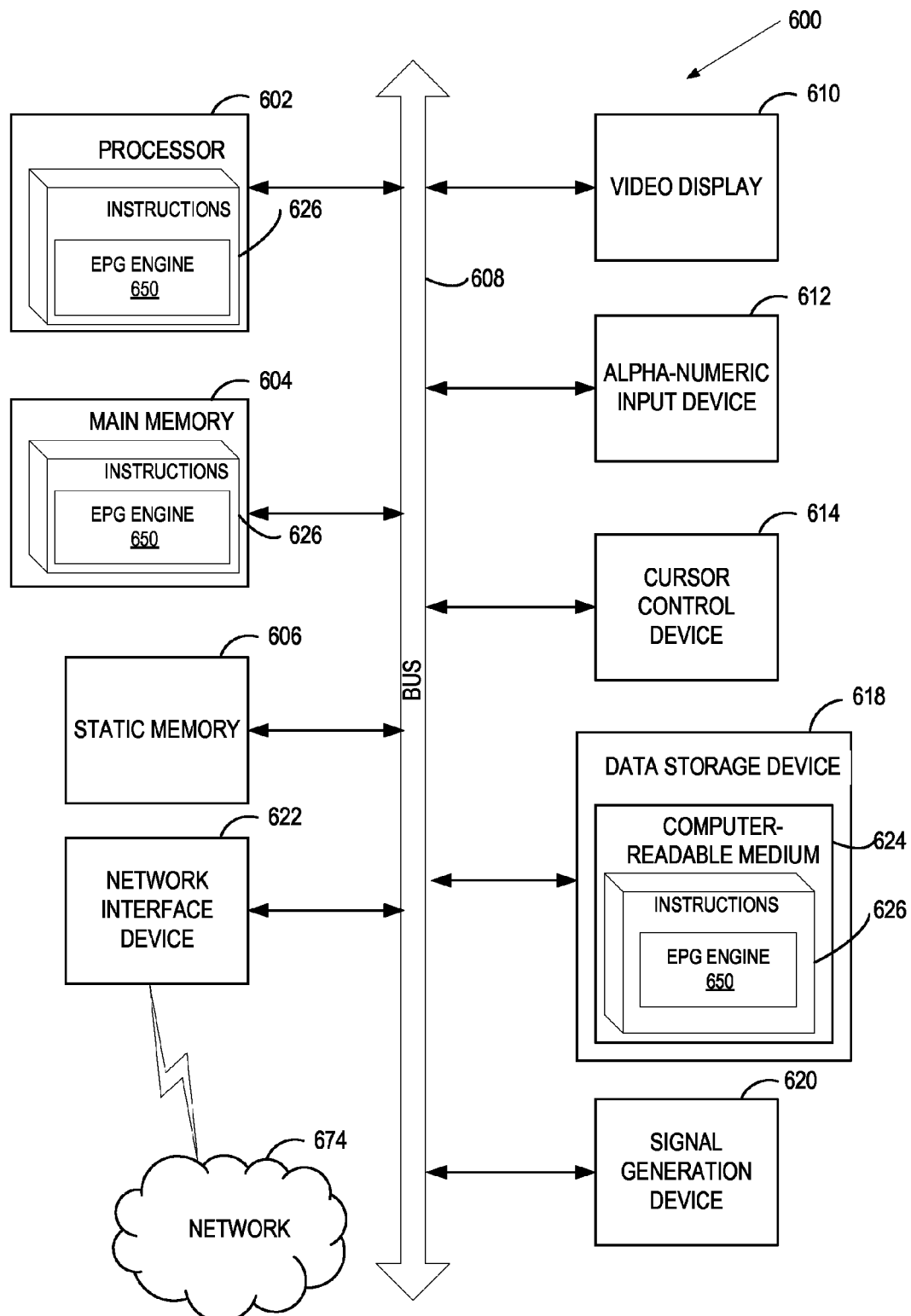
FIG. 6 is a block diagram of an exemplary computer system that may perform one or more of the operations described herein.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD), a cathode ray tube (CRT), or a touch screen), an alphanumeric input device 612 (e.g., a keyboard), a cursor control device 614 (e.g., a mouse), and a signal generation device 620 (e.g., a speaker).

The data storage device 618 may include a computer-readable storage medium 624 on which is stored one or more sets of instructions 626 (e.g., software) embodying any one or more of the methodologies or functions described herein. The instructions 626 may also reside, completely or at least partially, within the main memory 604 and/or within the processor 602 during execution thereof by the computer system 600, the main memory 604 and the processor 602 also constituting computer-readable storage media. The instructions 626 may further be transmitted or received over a network 674 via the network interface device 622.

In one embodiment, the instructions 626 include instructions for an EPG engine 650, which may correspond to EPG engine 120 of FIG. 1, and/or a software library containing methods that call an EPG engine. While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

I claim:

1. A method comprising:
providing, by a computing device to a user, a graphical user interface (GUI) comprising selectable user interface elements that indicate a type of content and a time to view the type of content, the selectable user interface elements initially selected by the computing device for the user based on data related to a first associate of the user;
receiving, via the GUI from the user, at least one of confirmations or adjustments to the initial selections of the selectable user interface elements in order for the selectable user interface elements to represent user preferences for content to be scheduled for the user;
identifying one or more content items of a content hosting service that satisfy the user preferences;
scheduling the identified one or more content items according to the user preferences;
including information about the scheduled one or more content items in a personalized electronic program guide (EPG);
providing, in the personalized EPG of the user, a channel of programmed content corresponding to at least one of the first associate or another associate of the user, wherein the channel of programmed content comprises content items selected for the at least one of the first associate or the another associate and scheduled in a different personalized EPG of the at least one of the first associate or the another associate, and wherein when the user selects the channel of programmed content corresponding to the at least one of the first associate or the another associate, a content item that is currently scheduled in the different personalized EPG is shown to the user; and
providing the personalized EPG for display to the user.

2. The method of claim 1, further comprising:
receiving access to a calendar of the user, wherein the data related to the user comprises at least data representing the calendar;
analyzing the data representing the calendar of the user to determine the suggestions for the time of the selectable user interface elements pre-selected by the computing device; and
reflecting the determined suggestions in the user interface elements of the GUI.

3. The method of claim 1, wherein the identifying one or more content items further comprising selecting the one or more content items based on the data related to the user comprising one or more of a location of the user, user-provided content ratings, or content ratings provided by associates of the user.

4. The method of claim 1, further comprising making available a personalized EPG of an associate of the user to represent the user preferences.

5. The method of claim 1, wherein the one or more content items are video content items.

6. The method of claim 1, further comprising sharing the personalized EPG of the user with one or more associates of the user based on a privacy policy.

7. The method of claim 1, further comprising reminding the user of a scheduled time of one or more content items in the personalized EPG of the user.

8. A computing device comprising:
a memory; and
a processing device communicably coupled to the memory, wherein the processing device is configured to:
provide, to a user, a graphical user interface (GUI) comprising selectable user interface elements that indicate a type of content and a time to view the type of content, the selectable user interface elements initially selected by the computing device for the user based on data related to a first associate of the user;
receive, via the GUI from the user, at least one of confirmations or adjustments to the initial selections of the selectable user interface elements in order for the selectable user interface elements to represent user preferences for content to be scheduled for the user;

identify one or more content items of one or more content hosting services that satisfy the user preferences;

schedule the identified one or more content items according to the user preferences;

include information about the scheduled one or more content items in a personalized electronic program guide (EPG);

provide, in the personalized EPG of the user, a channel of programmed content corresponding to at least one of the first associate or another associate of the user, wherein the channel of programmed content comprises content items selected for the at least one of the first associate or the another associate and scheduled in a different personalized EPG of the at least one of the first associate or the another associate, and wherein when the user selects the channel of programmed content corresponding to the at least one of the first associate or the another associate, a content item that is currently scheduled in the different personalized EPG is shown to the user; and provide the personalized EPG for display to the user.

9. The computing device of claim 8, wherein the processing device is further configured to:

receive access to a calendar of the user, wherein the data related to the user comprises at least data representing the calendar;

analyze the data representing the calendar of the user to determine the suggestions for the time of the selectable user interface elements pre-selected by the computing device; and reflect the determined suggestions in the user interface elements of the GUI.

10. The computing device of claim 8, wherein the processing device is further configured to determine the user preferences based at least in part on a personalized EPG of an associate of the user.

11. The computing device of claim 8, wherein the processing device is further configured to provide the personalized EPG for display on a mobile device.

12. The computing device of claim 8, wherein the processing device is further configured to provide a plurality of other personalized EPGs of other associates of the user as channels in the personalized EPG of the user, wherein the channels are selectable by the user in order to view content currently provided on the selected channel.

13. The computing device of claim 12, wherein the processing device is further configured to display each of the channels as days of the week in a user interface (UI) of the personalized EPG of the user.

14. A non-transitory computer readable storage medium having instructions that, when executed by a processing device, cause the processing device to perform operations comprising:

providing, by the processing device to a user, a graphical user interface (GUI) comprising selectable user interface elements that facilitate user input of a type of content and a time to view the type of content, the type of content and the time of the selectable user interface elements initially selected by the computing device for the user based on data related to a first associate of the user;

receiving, via the GUI from the user, at least one of confirmations or adjustments to the initial selections of the selectable user interface elements in order for the selectable user interface elements to represent user preferences for content to be scheduled for the user;

identifying one or more content items of a content hosting service that satisfy the user preferences;

scheduling the identified one or more content items according to the user preferences;

including information about the scheduled one or more content items in a personalized electronic program guide (EPG);

providing, in the personalized EPG of the user, a channel of programmed content corresponding to at least one of the first associate or another associate of the user, wherein the channel of programmed content comprises content items selected for the at least one of the first associate or the another associate and scheduled in a different personalized EPG of the at least one of the first associate or the another associate, and wherein when the user selects the channel of programmed content corresponding to the at least one of the first associate or the another associate, a content item that is currently scheduled in the different personalized EPG is shown to the user; and providing the personalized EPG for display to the user.

15. The non-transitory computer-readable storage medium of claim 14, wherein the instructions, when executed by the processing device, cause the processing device to perform further operations comprising:

receiving access to a calendar of the user, wherein the data related to the user comprises at least data representing the calendar;

analyzing the data representing the calendar of the user to determine the suggestions for the time of the selectable user interface elements pre-selected by the computing device; and reflecting the determined suggestions in the user interface elements of the GUI.

16. The non-transitory computer-readable storage medium of claim 14, wherein identifying one or more content items further comprises selecting the one or more content items based on the data related to the user comprising one or more of a location of the user, previous user-providing content ratings, or content ratings provided by associates of the user.

17. The non-transitory computer-readable storage medium of claim 14, wherein the instructions, when executed by the processing device, cause the processing device to perform further operations comprising providing an option to select at least one of the different personalized EPG corresponding to the associate to represent the user preferences or a template of a plurality of templates to represent the user preferences.

18. The non-transitory computer-readable storage medium of claim 14, wherein the instructions, when executed by the processing device, cause the processing device to perform further operations comprising sharing the personalize EPG of the user with one or more associates of the user based on a privacy policy.

19. The non-transitory computer-readable storage medium of claim 14, wherein the personalized EPG is provided for display on a mobile device.

* * * * *